US008867654B2

(12) United States Patent
Watanabe

(10) Patent No.: US 8,867,654 B2
(45) Date of Patent: Oct. 21, 2014

(54) TRANSMISSION DEVICE, COMMUNICATION SYSTEM, TRANSMISSION METHOD AND PROGRAM

(71) Applicant: Sony Corporation, Tokyo (JP)

(72) Inventor: Katsumi Watanabe, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/770,388

(22) Filed: Feb. 19, 2013

(65) Prior Publication Data

US 2013/0156128 A1 Jun. 20, 2013

Related U.S. Application Data

(62) Division of application No. 12/420,536, filed on Apr. 8, 2009, now Pat. No. 8,451,935.

(30) Foreign Application Priority Data

Apr. 14, 2008 (JP) ................................ 2008-105015

(51) Int. Cl.
*H04L 27/00* (2006.01)
*H04L 25/08* (2006.01)
*H04L 25/03* (2006.01)

(52) U.S. Cl.
CPC ............... *H04L 25/08* (2013.01); *H04L 25/03* (2013.01)
USPC ........... 375/295; 375/260; 375/286; 375/298; 375/316; 375/342

(58) Field of Classification Search
USPC ......... 375/130, 131, 135, 136, 140, 146, 152, 375/259, 271, 295, 302, 316, 350
See application file for complete search history.

(56) References Cited

U.S. PATENT DOCUMENTS

| | | | |
|---|---|---|---|
| 4,710,891 A | 12/1987 | Debus et al. | |
| 5,949,790 A * | 9/1999 | Pehkonen et al. | 370/465 |
| 6,031,865 A | 2/2000 | Kelton et al. | |
| 6,971,057 B1 * | 11/2005 | Delvaux et al. | 714/788 |
| 7,065,696 B1 * | 6/2006 | Liu et al. | 714/755 |
| 7,301,993 B2 | 11/2007 | Ibrahim | |
| 7,995,667 B2 * | 8/2011 | Hansen et al. | 375/265 |
| 8,046,028 B2 | 10/2011 | Kim et al. | |
| 8,098,713 B2 | 1/2012 | Baxley et al. | |
| 8,144,800 B2 | 3/2012 | Azenkot et al. | |
| 8,423,871 B2 * | 4/2013 | Murakami et al. | 714/776 |
| 2001/0008022 A1 * | 7/2001 | Kokuryo et al. | 714/786 |
| 2001/0033611 A1 * | 10/2001 | Grimwood et al. | 375/219 |
| 2004/0156386 A1 * | 8/2004 | Atarashi et al. | 370/441 |
| 2005/0195765 A1 * | 9/2005 | Sharon et al. | 370/330 |

(Continued)

FOREIGN PATENT DOCUMENTS

| | | | |
|---|---|---|---|
| JP | 10-13298 | 1/1998 | |
| JP | 2001-257730 | 9/2001 | |
| WO | WO 2006109437 A1 * | 10/2006 | H04B 7/04 |

*Primary Examiner* — Hirdepal Singh
(74) *Attorney, Agent, or Firm* — Finnegan, Henderson, Farabow, Garrett & Dunner, L.L.P.

(57) ABSTRACT

A transmission device of the present invention includes a baseband waveform generator to generate a transmission signal by using a transfer function $H_0(f)$ that is in a relation of a matched filter with a transfer function $H_1(f)$ in an analog domain of a transmission side and a reception side connected through a wireless channel, and transmits the transmission signal generated by the baseband waveform generator.

1 Claim, 21 Drawing Sheets

(56) References Cited

U.S. PATENT DOCUMENTS

| | | |
|---|---|---|
| 2007/0025320 A1 | 2/2007 | Padovani et al. |
| 2007/0213013 A1 | 9/2007 | Kim |
| 2007/0218942 A1 | 9/2007 | Khan et al. |
| 2008/0168332 A1* | 7/2008 | Palanki et al. ............... 714/776 |
| 2009/0201902 A1* | 8/2009 | Miki et al. .................... 370/342 |
| 2009/0294628 A1 | 12/2009 | Aoki |
| 2010/0239039 A1 | 9/2010 | Takai et al. |
| 2011/0304776 A1* | 12/2011 | Eitan et al. ................... 348/726 |

* cited by examiner

FIG.5

| Normalized Sample point : step=1/(8Rs) | Amplitude value |
|---|---|
| 0 | −1 |
| 1 | −1 |
| 2 | 1 |
| 3 | 5 |
| 4 | 8 |
| 5 | 8 |
| 6 | 6 |
| 7 | 2 |

| n mod 4 | Rotator | Input : Ssc(t) | Output : SPI(x) |
|---|---|---|---|
| 0 | 1 | Ssc(t0) | (2*Ssc(t0)-1) |
| 1 | j | Ssc(t1) | j*(2*Ssc(t1)-1) |
| 2 | -1 | Ssc(t2) | -(2*Ssc(t2)-1) |
| 3 | -j | Ssc(t3) | -j*(2*Ssc(t3)-1) |

FIG.12

| x | y | $S_{SC}(t)$ |
|---|---|---|
| 0 | 0 | 1 |
| 0 | 1 | 0 |
| 1 | 0 | 0 |
| 1 | 1 | 1 |

FIG.13

| Part of Packet | Input of $f_{SC}(x,y)$ : x | Input of $f_{SC}(x,y)$ : y |
|---|---|---|
| Preamble | 1 | $C_{PR}(t)$ |
| Sync | 1 | $C_{SY}(t)$ |
| PHY Header | $S_{SP}(t)$ | $C_{HE}(t)$ |
| PSDU | $S_{SP}(t)$ | $C_{PA}(t)$ |

FIG.15

| Part of Packet | Scrambling Seed [17:0] | Output of Scrambler : $C_{SC}(t)$ |
|---|---|---|
| Preamble | 0x10170 | $C_{PR}(t)$ |
| Sync | No scrambling sequence | |
| Header | 0x0004c | $C_{HE}(t)$ |
| Payload | 0x00079 | $C_{PA}(t)$ |

FIG.16

| 0 | 1 | 16 | 1 | 32 | 1 | 48 | 0 | 64 | 0 | 80 | 0 | 96 | 0 | 112 | 1 |
|---|---|---|---|---|---|---|---|---|---|---|---|---|---|---|---|
| 1 | 1 | 17 | 0 | 33 | 0 | 49 | 1 | 65 | 1 | 81 | 1 | 97 | 1 | 113 | 0 |
| 2 | 0 | 18 | 0 | 34 | 1 | 50 | 0 | 66 | 0 | 82 | 1 | 98 | 1 | 114 | 0 |
| 3 | 1 | 19 | 0 | 35 | 0 | 51 | 0 | 67 | 0 | 83 | 0 | 99 | 0 | 115 | 1 |
| 4 | 1 | 20 | 1 | 36 | 0 | 52 | 0 | 68 | 1 | 84 | 0 | 100 | 0 | 116 | 0 |
| 5 | 1 | 21 | 1 | 37 | 1 | 53 | 0 | 69 | 1 | 85 | 0 | 101 | 0 | 117 | 0 |
| 6 | 1 | 22 | 1 | 38 | 0 | 54 | 1 | 70 | 1 | 86 | 0 | 102 | 1 | 118 | 0 |
| 7 | 0 | 23 | 1 | 39 | 1 | 55 | 0 | 71 | 0 | 87 | 0 | 103 | 0 | 119 | 0 |
| 8 | 1 | 24 | 0 | 40 | 1 | 56 | 0 | 72 | 1 | 88 | 1 | 104 | 0 | 120 | 0 |
| 9 | 1 | 25 | 0 | 41 | 0 | 57 | 1 | 73 | 1 | 89 | 1 | 105 | 0 | 121 | 0 |
| 10 | 1 | 26 | 0 | 42 | 1 | 58 | 1 | 74 | 0 | 90 | 1 | 106 | 1 | 122 | 1 |
| 11 | 0 | 27 | 1 | 43 | 0 | 59 | 1 | 75 | 0 | 91 | 0 | 107 | 0 | 123 | 0 |
| 12 | 0 | 28 | 1 | 44 | 1 | 60 | 1 | 76 | 1 | 92 | 1 | 108 | 0 | 124 | 1 |
| 13 | 0 | 29 | 0 | 45 | 1 | 61 | 0 | 77 | 1 | 93 | 0 | 109 | 0 | 125 | 1 |
| 14 | 0 | 30 | 1 | 46 | 1 | 62 | 1 | 78 | 0 | 94 | 1 | 110 | 1 | 126 | 0 |
| 15 | 1 | 31 | 1 | 47 | 1 | 63 | 1 | 79 | 1 | 95 | 1 | 111 | 0 | 127 | 0 |

| Spreading Factor : $G_{SF}$ | Input : x(a=1 or 0) | Output : $S_{SP}(t)$ |
|---|---|---|
| 1 | a | a |
| 2 | a | a,a |
| 4 | a | a,a,a,a |
| 8 | a | a,···,a   : Repeat 8 times |
| 16 | a | a,··· ···,a : Repeat 16 times |

FIG.20

| x | y | $S_{DI}(t)$ |
|---|---|---|
| 1 | 1 | 1 |
| 0 | 0 | 1 |
| 1 | 0 | 0 |
| 0 | 1 | 0 |

FIG.21

| x | $S_{DI}(t)$ |
|---|---|
| 1 | 1 |
| 0 | 0 |

FIG.22

| Function | Description |
|---|---|
| Polynomial | $p(x)=x^5+x^4+x^3+x^2+1$ |
| Galois field | GF=(255) |
| Code length | 240Bytes |

FIG.23

| Function | Description |
|---|---|
| Constraint length | K=3 |
| Polynomial | G0=7oct, G1=5oct |

FIG.26

| Name | Data Rate (Mbps) | Spreading Factor : Gsf | Convolutional Code | Reed-Solmon Code | Num. of conv. Enc |
|---|---|---|---|---|---|
| Rate R | 560 | 1 | No | No | 0 |
| Rate S | 522 | 1 | No | Yes | 0 |
| Rate A | 261 | 1 | Yes | Yes | 2 |
| Rate B | 130 | 2 | Yes | Yes | 1 |
| Rate C | 65 | 4 | Yes | Yes | 1 |
| Rate D | 32 | 8 | Yes | Yes | 1 |
| PHY Header | 16 | 16 | Yes | No | 1 |

TRANSMISSION DEVICE, COMMUNICATION SYSTEM, TRANSMISSION METHOD AND PROGRAM

This is a division of application Ser. No. 12/420,536, filed Apr. 8, 2009, which claims the benefit to Japanese Application No. 2008-105015, filed Apr. 14, 2008, both of which are incorporated herein by reference.

BACKGROUND OF THE INVENTION

1. Field of the Invention

The present invention relates to a transmission device, a communication system, a transmission method and a program.

2. Description of the Related Art

In the past, a short range communication system, such as a MB-OFDM scheme adopted by a wireless USB, having a distance of about 10 m in view has been proposed.

[Patent Document 1] JP-A-2005-253102

SUMMARY OF THE INVENTION

However, the MB-OFDM scheme adopts a multi-carrier system to communicate at a communication distance of about 10 m. Thus, problems arise that a circuit for transmission and reception is complicated, that circuit size grows, and also, that consumption power increases. Further, due to the circuit design, unwanted elements such as DC cut, distortion of the frequency characteristics, and the like, may be included in the transmission and reception sides, and the need arises to compensate for the degradation in an analog domain of the transmission side and the reception side connected through a wireless channel.

Thus, in view of the foregoing, it is desirable to provide a transmission device, a communication system, a transmission method and a program that are new and improved, and that are capable of reducing the circuit size and maximizing the signal-to-noise power ratio (SNR) on the reception side.

According to an embodiment of the present invention, there is provided a transmission device including a waveform generator to generate a transmission signal by using a transfer function that is in a relation of a matched filter with a transfer function in an analog domain of a transmission side and a reception side connected through a wireless channel, and a transmitter to transmit the transmission signal generated by the waveform generator.

Further, a modulation processor, provided before the waveform generator, to perform $\pi/2$ shift BPSK modulation on the transmission data may be further included.

According to another embodiment of the present invention, there is provided a transmission device including a spreader to spread transmission data in a time domain by using only a long code spreading sequence configured by a M sequence (maximal-length sequence) of long period, without using a short code spreading sequence such as a Barker code, M sequences and complementary code of short period, or the like, a waveform generator to generate, by using a transfer function that is in a relation of a matched filter with a transfer function in an analog domain of a transmission side and a reception side connected through a wireless channel, a transmission waveform from the data spread by the spreader, and a transmitter to transmit the transmission waveform generated by the waveform generator.

According to another embodiment of the present invention, there is provided a transmission device including an encoder to encode transmission data, the encoder being capable of switching between a differential encoding and a non-differential encoding that does not include a phase reference signal (pilot signal), that is, a general synchronization detection signal, a waveform generator to generate, by using a transfer function that is in a relation of a matched filter with a transfer function in an analog domain of a transmission side and a reception side connected through a wireless channel, a transmission waveform from the data encoded by the encoder, and a transmitter to transmit the transmission waveform generated by the waveform generator.

According to another embodiment of the present invention, there is provided a transmission device including a Reed-Solomon encoder to Reed-Solomon encode transmission data, a convolutional encoder to convolutionally encode the transmission data, a spreader to spread the transmission data in a time domain, and a rate controller to control transmission rate of the transmission data by controlling ON-OFF of encoding by the Reed-Solomon encoder, ON-OFF of encoding by the convolutional encoder, or spreading factor of the spreader.

According to another embodiment of the present invention, there is provided a transmission device including a first convolutional encoder to convolutionally encode transmission data, a second convolutional encoder that is connected in parallel with the first convolutional encoder, a selector to alternately input the transmission data to the first convolutional encoder and the second convolutional encoder, and a controller to turn off one of the first convolutional encoder and the second convolutional encoder according to a transmission rate of the transmission data.

According to another embodiment of the present invention, there is provided a communication system including a transmission device that has a waveform generator to generate a transmission signal by using a transfer function that is in a relation of a matched filter with a transfer function in an analog domain o a transmission side and a reception side connected through a wireless channel and a transmitter to transmit the transmission signal generated by the waveform generator, and a reception device that is connected to the transmission device via the wireless channel in a communicable manner and that includes the analog domain extending from the wireless channel to an A-D converter for a received signal.

According to another embodiment of the present invention, there is provided a transmission method including the steps of generating a transmission signal by using a transfer function that is in a relation of a matched filter with a transfer function in an analog domain of a transmission side and a reception side connected through a wireless channel, and transmitting the generated transmission signal.

According to another embodiment of the present invention, there is provided a program causing a computer to function as a unit to generate a transmission signal by using a transfer function that is in a relation of a matched filter with a transfer function in an analog domain of a transmission side and a reception side connected through a wireless channel, and a unit to transmit the generated transmission signal.

According to the present invention, a transmission device, a communication system, a transmission method and a program capable of reducing the circuit size and maximizing the SNR on the reception side are provided.

BRIEF DESCRIPTION OF THE DRAWINGS

FIG. 5 is a schematic diagram showing amplitude value in relation to FIG. 3.

FIG. 12 is a schematic diagram showing a truth table for an operation of the scrambler.

FIG. 13 is a schematic diagram showing input signals x and y in the scrambler.

FIG. 15 is a schematic diagram showing a relationship between scrambling seeds and scrambling sequences $C_{PR}(t)$, $C_{SY}(t)$, $C_{HE}(t)$ and $C_{PA}(t)$ of the LFSR.

FIG. 16 is a schematic diagram showing the scrambling sequence $C_{SY}(t)$ of a sync portion.

FIG. 20 is a diagram showing a truth table at the time of differential encoding ($T_{DI}=1$).

FIG. 21 is a diagram showing a truth table at the time of non-differential encoding.

FIG. 22 is a schematic diagram showing a Reed-Solomon code of a Reed-Solomon encoder.

FIG. 23 is a schematic diagram showing a convolution code of a convolutional encoder.

FIG. 26 is a schematic diagram showing data rate and parameters controlling the data rate.

DETAILED DESCRIPTION OF THE PREFERRED EMBODIMENTS

Figure 1:
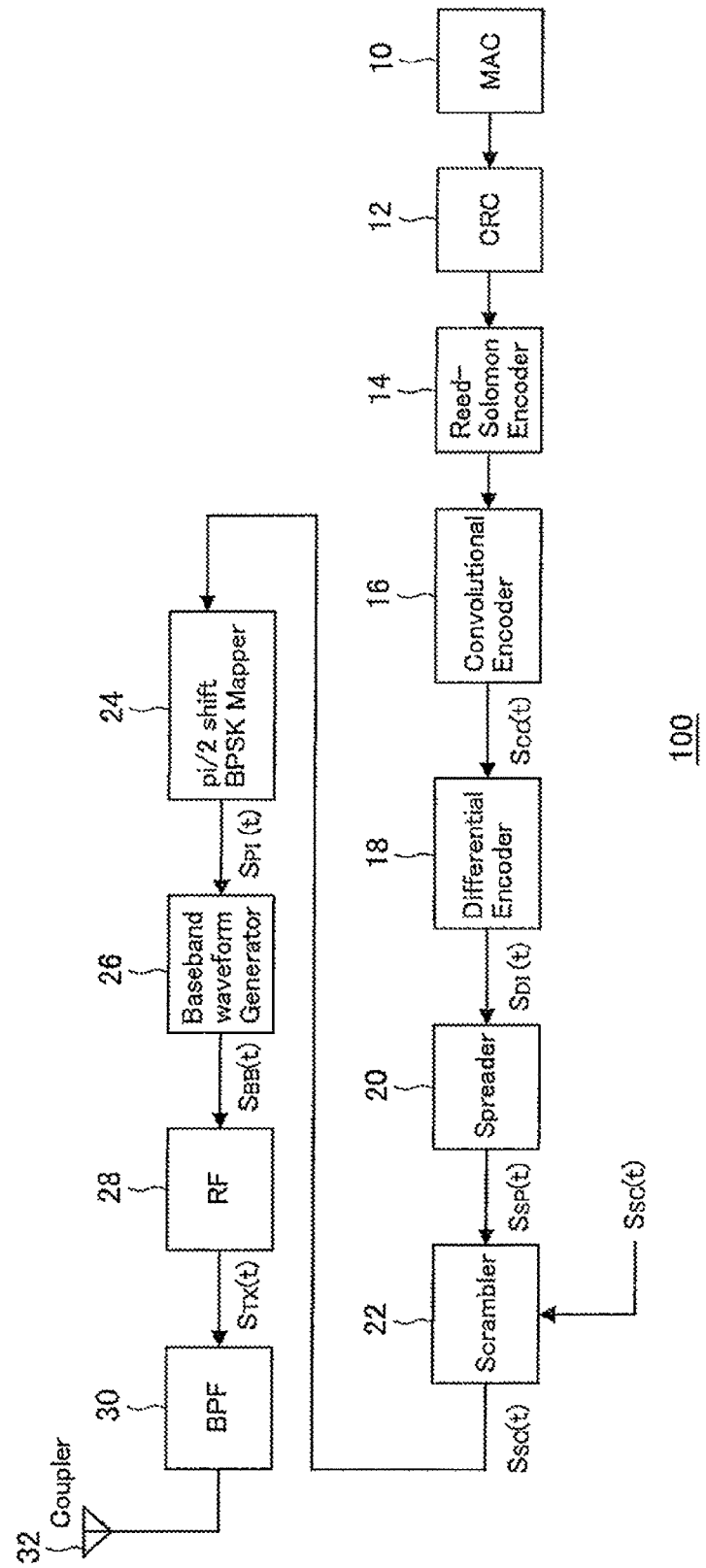
FIG. 1 is a schematic diagram showing a configuration of a wireless transmission device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a schematic diagram showing a configuration of a wireless transmission device 100 according to an embodiment of the present invention. As shown in FIG. 1, the wireless transmission device 100 of the present embodiment includes a media access control (MAC) 10, a cyclic redundancy check (CRC) 12, a Reed-Solomon encoder 14, a convolutional (Viterbi) encoder 16, a differential encoder 18, a spreader 20, a scrambler 22, a Pi/2 shift BPSK mapper 24, a baseband waveform generator 26, an RF circuit 28, a band pass filter (BPF) 30 and an antenna 32. The wireless transmission device 100 transmits data using a single carrier system, and the device can be configured to be much simpler than when using the MB-OFDM scheme of a multi-carrier system. Note that each block shown in FIG. 1 can be configured with hardware (circuit). However, when configuring each block with a central processing unit (CPU) and software (program) that causes the CPU to function, the program can be stored in a recording medium such as a memory included in the wireless transmission device 100.

Figure 2:
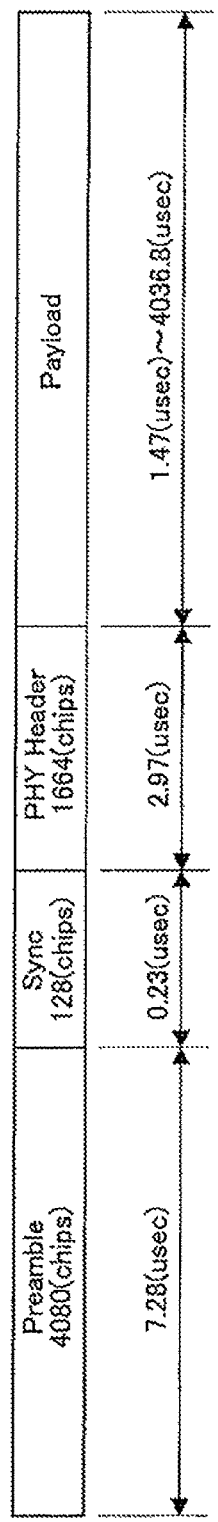
FIG. 2 is a schematic diagram showing a frame format of a transmission packet used in the present embodiment.

FIG. 2 is a schematic diagram showing a frame format of a transmission packet used in the present embodiment. As shown in FIG. 2, the transmission packet is configured by preamble, sync, PHY header and payload.

First, the configuration of the wireless transmission device 100 of FIG. 1 will be described. The transmission data transmitted from the MAC 10 is input to the CRC 12 and a cyclic redundancy check is performed thereon. The output from the CRC 12 is sequentially input to the Reed-Solomon encoder 14 and the convolutional encoder 16, and encoding is performed by these encoders. The Reed-Solomon encoder 14 and the convolutional encoder 16 determine, according to data rate, whether or not to perform encoding. As will be described in detail later, ON-OFF of each encoder will be determined based on the data rate specified in FIG. 26. Thus, rate control can be performed according to the ON-OFF of the encoders 14 and 16.

The encoded data is differentially encoded by the differential encoder 18, and is then spread by the spreader 20. The differential encoder 18 can select as appropriate between differential encoding and non-differential encoding as will be described later in detail.

The output of the differential encoder 18 is sent to the spreader 20. In the wireless transmission device 100 according to the present embodiment, the spreader 20 simply makes copies of an input symbol by the value of process gain $G_{SF}$.

The data that is spread by the spreader 20 is scrambled by the scrambler 22. The scrambler 22 performs the scrambling by using a pseudo random sequence generated by the linear feedback shift register (LFSR). In the wireless transmission device 100 of the present embodiment, different seeds are used by the preamble, PHY header and PSDU in the frame format shown in FIG. 2.

The data scrambled by the scrambler 22 is input to the Pi/2 shift BPSK mapper 24. The Pi/2 shift BPSK mapper 24 multiplies each sample of the input signal by rotators having rotation angles that are different by 90 degrees according to each sample, and spreading from a binary sequence to a complex number signal is performed thereon.

The output of the Pi/2 shift BPSK mapper 24 is input to the baseband waveform generator 26. The baseband waveform generator 26 in configured by a filter having the baseband waveform shown in FIG. 3 as an impulse response. The baseband signal $S_{BB}(t)$ generated by the baseband waveform generator 26 is input to the RF circuit 28, and is up-converted to a center frequency Fc by an RF module of the RF circuit 28.

Next, each function block of the wireless transmission device 100 of FIG. 1 will be described in detail.

Baseband Waveform Generator

Equations 1 and 2 are equations showing a mathematical framework of an RF transmission signal $S_{TX}(t)$ in the present system. In Equation (1), $S_{TX}(t)$ indicates the output of the RF circuit 28. In Equation (1), $F_c$ indicates the center frequency and Re(x) indicates an operation for obtaining the real part of a complex number.

Figure 4:
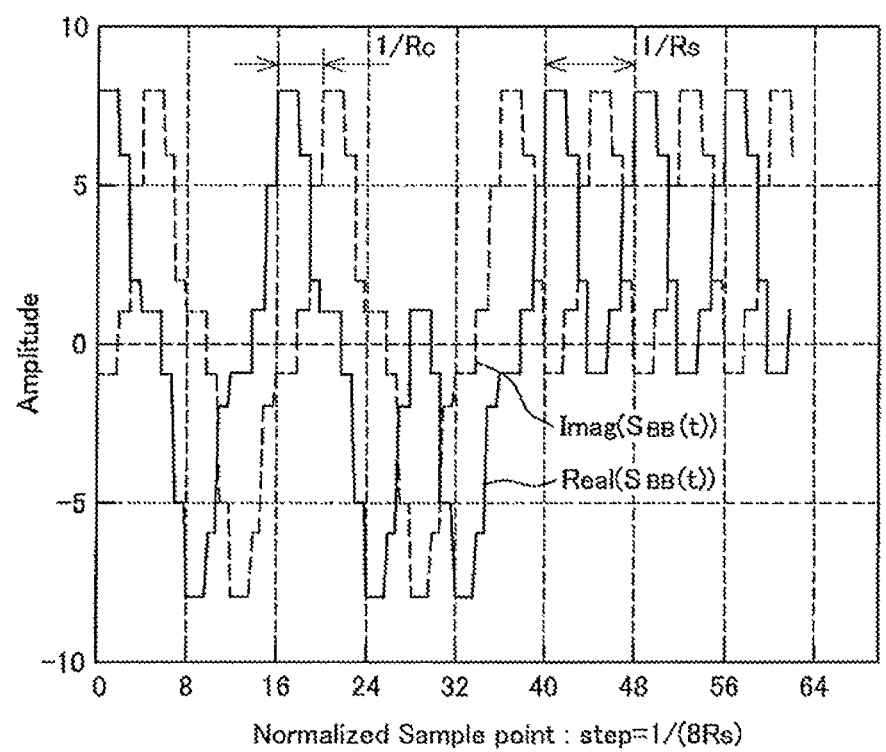
FIG. 4 is a characteristics diagram showing a transmission baseband sequence $S_{BB}(t)$.

Further, in Equation (1), $S_{BB}(t)$ indicates a transmission baseband sequence, which is the output of the baseband waveform generator 26. FIG. 4 is a characteristics diagram showing the transmission baseband sequence $S_{BB}(t)$. In FIG. 4, the solid line indicates the real part of $S_{BB}(t)$ and the broken line indicates the imaginary part of $S_{BB}(t)$. Further, in FIG. 4, the horizontal axis of the graph indicates sample points having $1/(8R_s)$ as steps. In the present embodiment, the symbol sequence of the imaginary part is delayed by about ½ symbol from the symbol sequence of the real part. Thus, the symbol of the real part and the symbol of the imaginary part appear alternately in the complex envelope of the transmission signal. In the present system, the interval between the symbol of the real part and the symbol of the imaginary part is defined as a chip interval. Consequently, the relation of 1/Rs=2*1/Rc is established.

Figure 3:
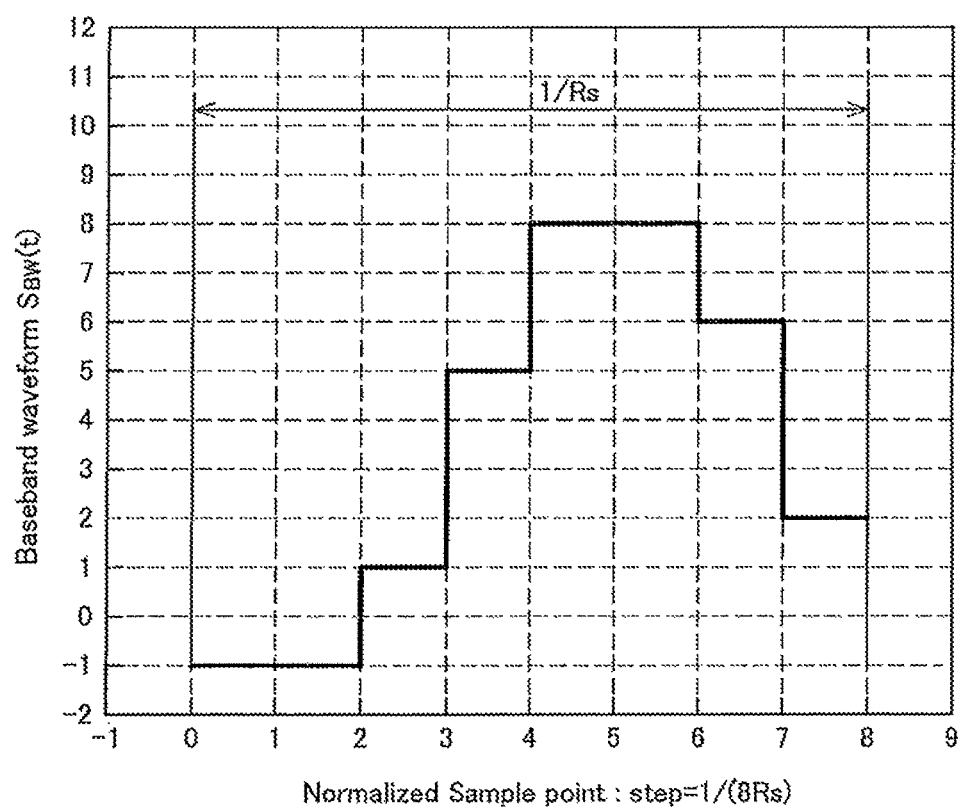
FIG. 3 is a schematic diagram showing a baseband waveform of a baseband waveform generator.

In Equation (2), $S_{BW}(t)$ indicates the transmission baseband waveform. The transmission baseband waveform $S_{BW}(t)$ shown in FIG. 3 is an impulse response to an input "1". Further, in Equation (2), $S_{PI}(t)$ is the output of the Pi/2 shift BPSK mapper 24, and is a complex number signal modulated by PI/2 shift D-BPSK. Further, $N_{chip}$ indicates the number of transmission chips.

[Formula 1]

$$S_{TX}(t) = \text{Re}(S_{BB}(t) \cdot \exp(j2\pi F_c t)) \quad \text{Equation (1)}$$

$$S_{BB}(t) = S_{BW}(t) \otimes \sum_{n=0}^{N_{chip}-1} S_{PI}(t - n \cdot T_c) \quad \text{Equation (2)}$$

(Note that, in Equation (2), ⊗ indicates convolution.)

As shown in FIG. 3, the transmission baseband waveform $S_{BW}(t)$ used by the baseband waveform generator 26 is defined as a discrete value. In FIG. 3, one cycle of the waveform is expressed with 8 samples, and the horizontal axis indicates normalized sample points. Further, the cycle of the waveform is 1/Rs which is an inverse of symbol rate. FIG. 5 is a schematic diagram showing the amplitude value in relation to FIG. 3.

Accordingly, the baseband sequence $S_{BB}(t)$ to be output from the baseband waveform generator 26 becomes a template waveform having a one-to-one correspondence with the input signal $S_{PI}(t)$. When a general waveform generation filter is used, as with a finite impulse response (FIR) filter, since one output signal is configured by multiple points on an input signal, the input signal and the output signal do not correspond to each other in a one-to-one manner. In the present embodiment, since the template waveform is being used, the output $S_{BB}(t)$ corresponds to the input signal $S_{PI}(t)$ to the baseband waveform generator 26 in a one-to-one manner, and the baseband waveform generator 26 can be simply configured, and also, calculation amount is reduced, and thus, processing speed can be greatly increased. Further, since the transmission baseband waveform $S_{BW}(t)$ is defined as a discrete value, the spectrum of the transmission signal can be determined without a low pass filter (LPF) being included. Further, since a transmission waveform is in the form of discrete values, a high bandwidth low pass filter needs not be included, and the circuit configuration can be simplified.

Figure 6:
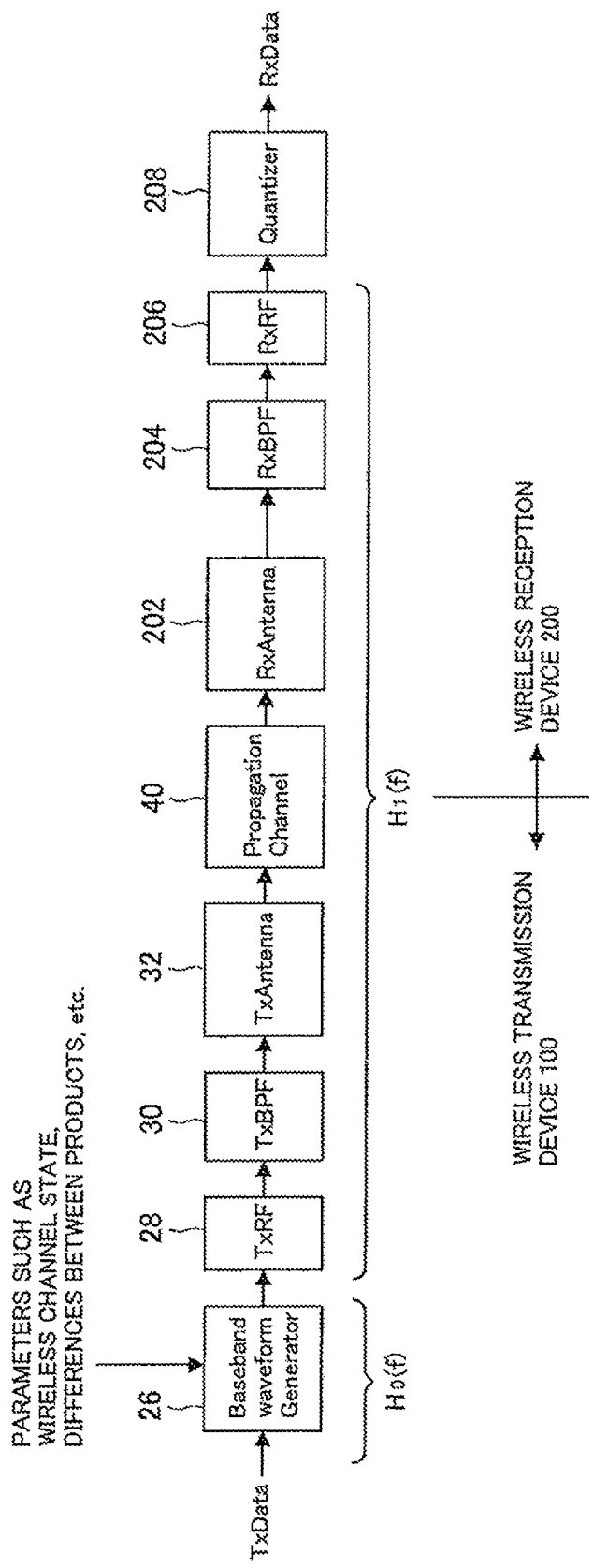
FIG. 6 is a schematic diagram showing a principle for maximizing the SNR of a reception system by the baseband waveform generator.

In the wireless transmission device according to the present embodiment, the baseband waveform generator 26 is configured as described above, and a transmission waveform where SNR of a reception system is maximized is transmitted. FIG. 6 is a schematic diagram showing a principle for maximizing the SNR of the reception system by the baseband waveform generator 26. FIG. 6 shows a state where the wireless transmission device 100 according to the present embodiment is connected with a wireless reception device 200 via a wireless propagation channel 40. A signal transmitted through the wireless propagation channel 40 is received by an antenna (R×Antenna) 202 of the wireless reception device 200 and is sequentially sent to a band pass filter (R×BPF) 204, an RF circuit (R×RF) 206 and an A-D converter (quantizer) 208.

In FIG. 6, the domain from after the baseband waveform generator 26 to before the A-D converter 208 of the wireless reception device 200 is an analog domain through which an analog signal is propagated. Due to the circuit design, a signal is generally hard to control in the analog domain, and a signal may be distorted. In the present embodiment, by using the baseband waveform generator 26 on the transmission side that is in a relation of a matched filter with the analog domain, the SNR of a signal received through the analog domain can be maximized. As a result, the error vector magnitude (EVM) of a signal to be input to the A-D converter (quantizer) 208 of the wireless reception device 200 can be reduced.

Concretely describing the technique, in FIG. 6, $H_0(f)$ indicates the frequency response (transfer function) of the transmission waveform from the baseband waveform generator 26. Further, $H_1(f)$ indicates the frequency response (transfer function) in the analog domain covering the RF circuit (T×RF) 28 of the wireless transmission device 100, the band pass filter 30, the antenna 32, the wireless propagation channel 40, the antenna 202 and the band pass filter 204 of the wireless reception device 200 and the RF circuit 206. Here, to maximize the signal-to-noise power ratio (SNR) of a signal to be input to the A-D converter (quantizer) 208 of the wireless reception device 200, $H_0(f)$ and $H_1(f)$ are desirably in a relation of a matched filter (that is, a relation of an optimum filter). Accordingly, the relation of the following Equation (3) is established between H0 and H1.

[Formula 2]

$$H_0(f) = H^*_1(f) e^{-j2\pi f T_d} \quad \text{Equation (3)}$$

In Equation (3), Td indicates sampling delay time. As seen from the above, in the present embodiment, the baseband waveform generator 26 is configured such that the frequency response of the baseband waveform generator 26 is in a relation of a matched filter with the frequency response of the analog domain from the wireless transmission device 100 to the wireless reception device 200. Since the value of $H_1(f)$ is determined based on the design of the analog circuit domain, by matching $H_0(f)$ of the baseband waveform generator 26 of the wireless transmission device 100 to the value of $H_1(f)$, the SNR after reception can be maximized. Further, as shown in FIG. 6, parameters such as wireless channel state, differences between products, and the like, may be fed back to the baseband waveform generator 26 and $H_0(f)$ may be flexibly changed in consideration of the change in H0 due to the change in the parameters.

Figure 7:
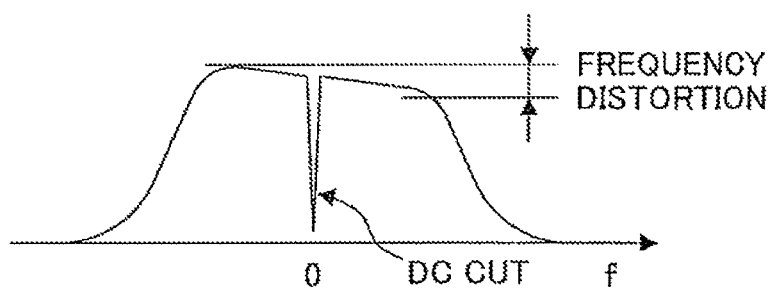
FIG. 7 is a schematic diagram showing examples of DC cut and frequency distortion occurring due to transmission and reception.

According to the configuration as described above, even when distortion of the frequency characteristics as shown in FIG. 7 occurs in the frequency characteristics of the analog domain o a transmission side and a reception side connected through a wireless channel, the value of $H_0(f)$ can be set such that the SNR is maximized at the baseband waveform generator 26. Accordingly, degradation of a received signal caused by elements as shown in FIG. 7 can be reduced to the minimum.

(Pi/2 Shift BPSK Mapper)

Figure 8:
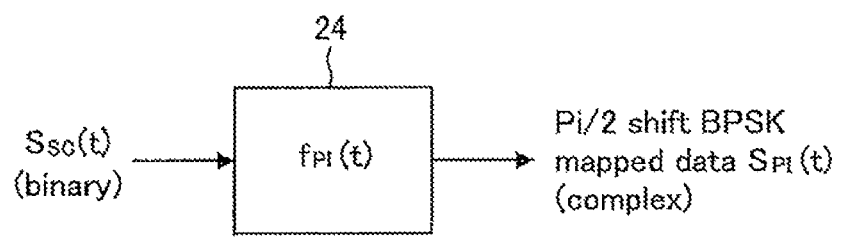
FIG. 8 is a schematic diagram showing a configuration of a Pi/2 shift BPSK mapper.

FIG. 8 is a schematic diagram showing a configuration of the Pi(=π)/2 shift BPSK mapper 24. The Pi/2 shift BPSK mapper 24 has a function of outputting an input binary sequence (0 or 1) as a complex sequence (1, −1, j, −j).

Figure 9:
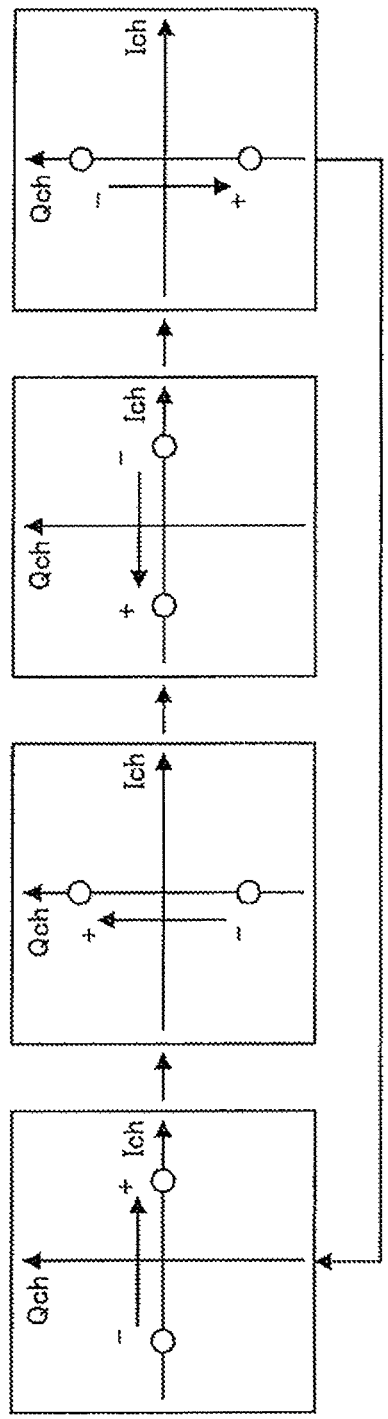
FIG. 9 is a schematic diagram showing a Pi/2 shift BPSK modulation by the Pi/2 shift BPSK mapper.
Figures 10, 11:
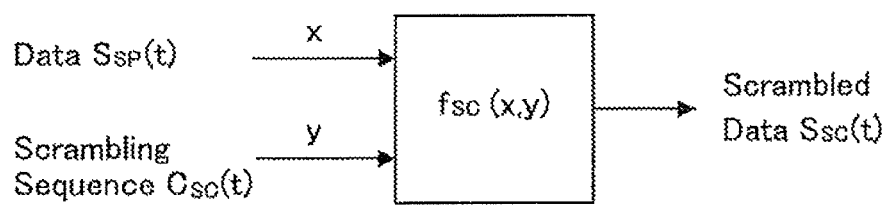
FIG. 10 is a schematic diagram showing a relationship between the input and output of the Pi/2 shift BPSK mapper.
FIG. 11 is a schematic diagram showing a configuration of a scrambler.

FIG. 9 is a schematic diagram showing a Pi/2 shift BPSK modulation by the Pi/2 shift BPSK mapper 24. Also, FIG. 10 is a schematic diagram showing a relationship between the input and output of the Pi/2 shift BPSK mapper 24. In FIG. 10, n indicates the chip number. As shown in FIGS. 9 and 10, in the Pi/2 shift BPSK modulation, the modulation axis for the BPSK modulation is rotated by 90 degrees for every chip. Here, the rotation period of the modulation axis is 4 chips. As shown in FIG. 10, rotator (1, j, 1−, j) of the Pi/2 shift BPSK mapper 24 rotates by n mod 4.

$S_{SC}(t_n)$ which is an input signal to the Pi/2 shift BPSK mapper 24 indicates a binary output of the scrambler 22 at a time $t_n=n*T_c$. Here, in FIG. 10, the function $(2*S_{SC}(t_n)-1)$ included in the output $S_{PI}(x)$ indicates conversion from binary digits (0, 1) to real numbers (−1, 1). After being converted from binary digits to real numbers, $S_{PI}(x)$, which is an output sequence, is multiplied by the rotator (1, j, −1, −j).

In the Pi/2 shift BPSK modulation by the Pi/2 shift BPSK mapper 24, the modulation axis is rotated by 90 degrees for every chip, and I and Q are alternately used for the modulation axis. According to such a configuration, the output of the Pi/2 shift BPSK mapper 24 becomes a value on a real axis or on an imaginary axis, and a value on the real axis and a value on the imaginary axis will appear alternately. Thus, as shown in FIG. 4, a section where the amplitude factor is 0 can be generated for both of the real part Real($S_{BB}$(t)) and the imaginary part imag($S_{BB}$(t)) of the transmission baseband sequence $S_{BB}$(t), which is an output of the baseband waveform generator 26. In general QPSK and BPSK, since the outputs of a mapper do not exist alternately on the real axis and the imaginary axis, a transmission baseband sequence $S_{BB}$(t) as shown in FIG. 4 cannot be transmitted. Accordingly, according to the present embodiment, intersymbol interference on I channel and Q channel can be reduced at the time of reception, and the received EVM at the wireless reception device 20 is improved.

(Scrambler)

FIG. 11 is a schematic diagram showing a configuration of the scrambler 22. The scrambler 22 converts a signal $S_{SF}$(t) spread by the spreader 20 to a random sequence by using a random number, and generates an input signal $S_{SC}$(t) to the Pi/2 shift BPSK mapper 24.

FIG. 12 is a schematic diagram showing a truth table for an operation of the scrambler 22. As a rule, the scrambler 22 obtains the inverted XOR of the signal $S_{SF}$(t) spread by the spreader 20 and a signal $C_{SC}$(t) generated by the linear feedback shift register (LFSP).

FIG. 13 is a schematic diagram showing input signals x and y in the scrambler 22. As shown in FIG. 13, in the present embodiment, scrambling sequences $C_{PR}$(t), $C_{SY}$(t), $C_{HE}$(t) and $C_{PA}$(t) with different initial values are used in the preamble, sync, PHY header and PLCP service data unit (PSDU) of a transmission packet. As shown in FIG. 13, as for the preamble and sync, input data x to be scrambled is fixed to 1, and thus, scrambling sequences $C_{PR}$(t) and $C_{SY}$(t) are output as they are. On the other hand, as for the PHY header and PSDU, the inverted XOR of the signal $S_{SF}$(t) and signals $C_{HE}$(t) and $C_{PA}$(t) are output from the scrambler 22.

(Scrambling Sequence Generator)

Figure 14:
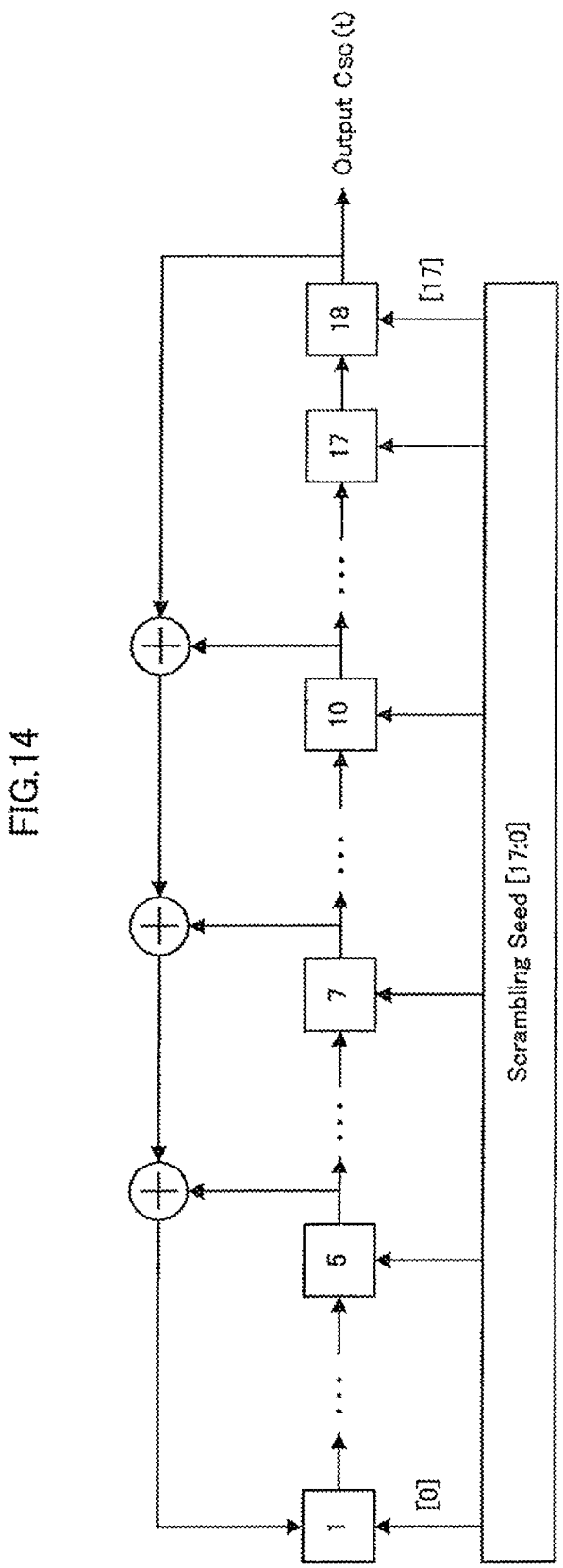
FIG. 14 is a schematic diagram showing a configuration of a LFSR as a scrambling sequence generator.

A scrambling sequence generator generates the scrambling sequences $C_{PR}$(t), $C_{SY}$(t), $C_{HE}$(t) and $C_{PA}$(t) to be input to the scrambler 22. FIG. 14 is a schematic diagram showing a configuration of a LFSR 23 as the scrambling sequence generator. Further, Equation (4) shows a generation polynomial of the LFSR 23 for the scrambling sequence. The scrambling sequence is formed of a bit string of $2^{18}$. Further, FIG. 15 shows a relationship between scrambling seeds and the scrambling sequences $C_{PR}$(t), $C_{SY}$(t), $C_{HE}$(t) and $C_{PA}$(t) of the LFSR 23. With the scrambling sequence generator, the values of registers are initialized at the beginning of each of the preamble, sync, PHY header and PSDU of the packet by a scrambling seed [17:0]. Then, a scrambling sequence of a random sequence is generated by the LFSR 23 with the scrambling seed as the seed. As shown in FIG. 15, the value of the scrambling seed is set differently for each of the preamble, header and payload. Thus, a scrambling sequence can be generated, in each of the preamble, header and payload, from a desired position in the scrambling sequence formed of a bit string of $2^{18}$.

[Formula 3]

$$G(x)=x^{18}+x^{10}+x^7+x^5+1 \qquad \text{Equation (4)}$$

The sync of the packet is a word portion of 128 chips for frame synchronization. In the present embodiment, as for the preamble, sync, PHY header and PSDU of the packet, the scrambling sequences $C_{PR}$(t), $C_{HE}$(t) and $C_{PA}$(t) generated by the LFSR are used. On the other hand, as shown in FIG. 15, as for the sync, the scrambling sequence $C_{SY}$(t) is not generated by the LFSR, and a sequence stored in a memory, such as a ROM, provided in the wireless transmission device 100 is used.

FIG. 16 is a schematic diagram showing the scrambling sequence $C_{SY}$(t) of a sync portion, and shows a word $C_{SY}$(t) for packet synchronization. $C_{SY}$(t) is configured by 128 chips, and is transmitted from the index which is the 0-th chip. As described above, the scrambling sequence is not used in the sync of the packet, and $C_{SY}$(t) shown in FIG. 16 is output from the scrambler as it is.

As seen from above, by dividing the preamble of the packet into a random sequence part and a known sync, transmission of an arbitrary signal by the random sequence part and addition of arbitrary information element to the random sequence part become possible.

(Spreader)

Figures 17, 18:
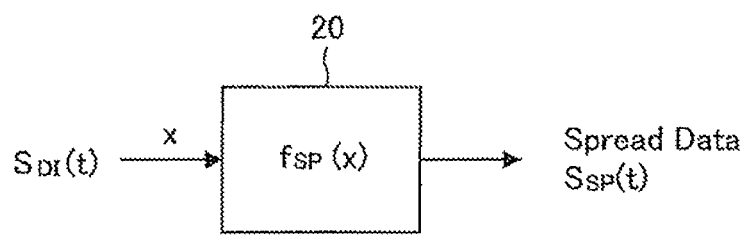
FIG. 17 is a schematic diagram showing a configuration of a spreader.
FIG. 18 is a schematic diagram showing a relationship between the input and output of an operation of the spreader.

FIG. 17 is a schematic diagram showing a configuration of the spreader 20. Further, FIG. 18 is a schematic diagram showing a relationship between the input and output of an operation of the spreader. In the present embodiment, by setting an inner spreading code of the spreader 20 to 1, spreading is performed by an outer spreading code, that is, a long code, without using an inner spreading sequence. Thus, the processing of the inner spreading code can be omitted, and the circuit size can be reduced. The spreader 20 makes copies of the input signal according to the data rate (that is, a spreading factor $G_{SF}$) shown in FIG. 26. For example, as shown in FIG. 26, when the data rate is 32 Mbps, $G_{SF}$ is 8. Thus, as shown in FIG. 18, input data a (0 or 1) is copied, and 8 pieces of data a are output. Accordingly, a symbol rate is different for the input and output of the spreader 20 by $G_{SF}$ of process gain.

(Differential Encoder)

Figure 19:
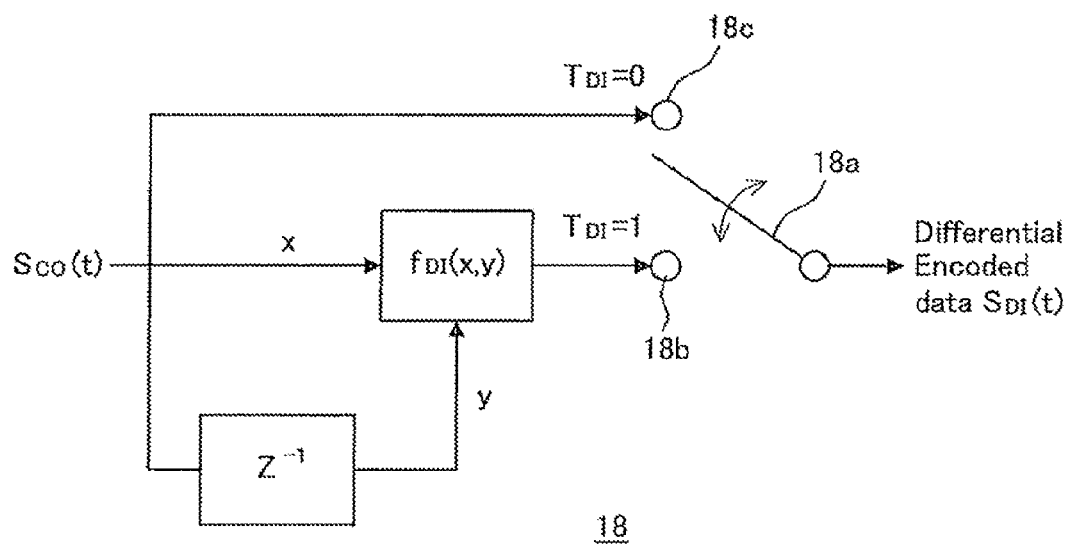
FIG. 19 is a schematic diagram showing a configuration of a differential encoder.
Figures 20, 21:
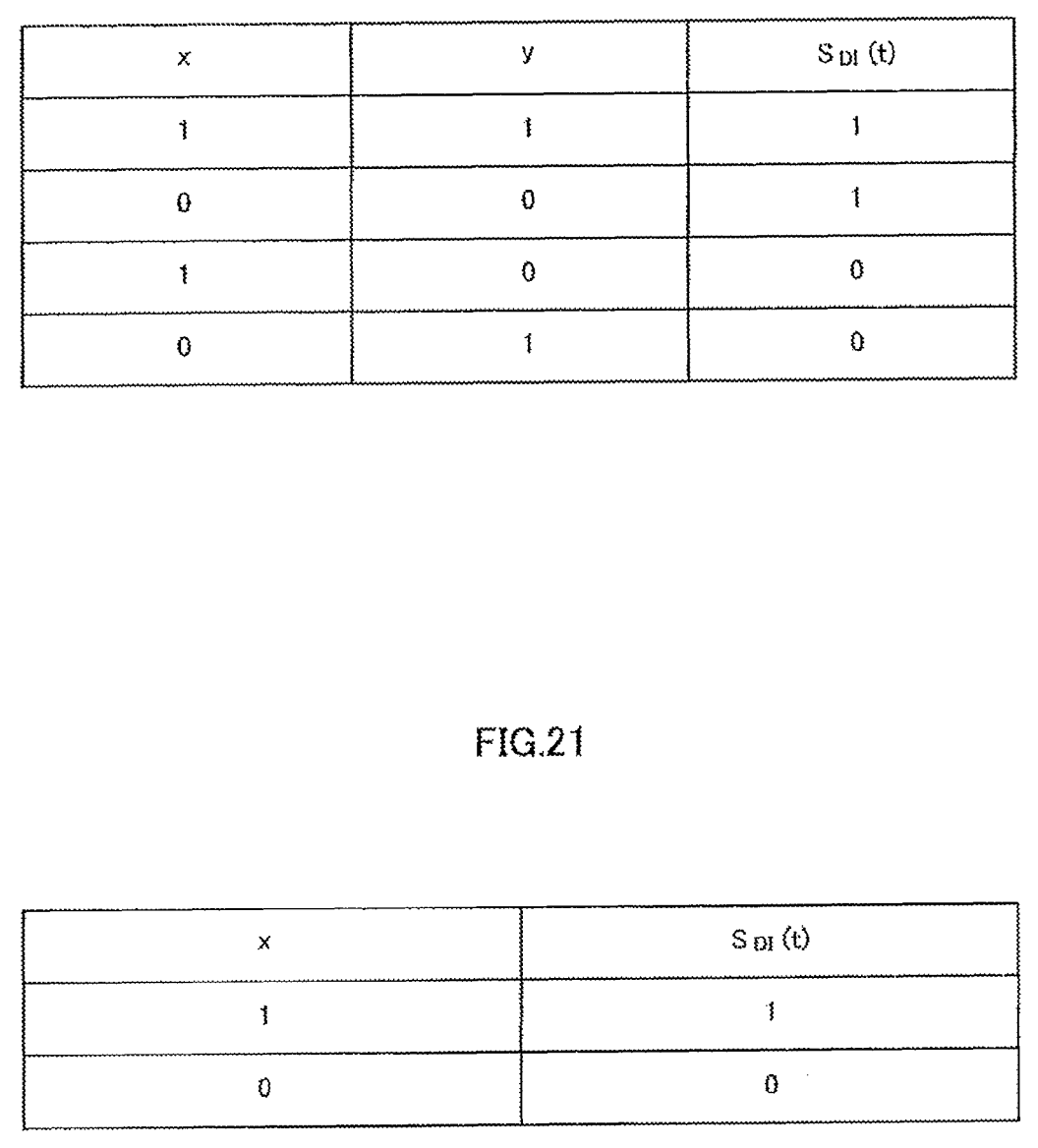

FIG. 19 is a schematic diagram showing a configuration of the differential encoder 18. Further, FIGS. 20 and 21 are diagrams showing a truth table of the differential encoder. As shown in FIG. 19, in the present embodiment, it is possible to switch between a differential encode mode and a through mode by a toggle switch 18a that operates according to the value of a signal $T_{DI}$.

As shown in FIG. 19, the differential encoder 18 includes Z-1 and fDI(x,y) for performing the differential encoding. The toggle switch 18a is connected to a terminal 18b when $T_{DI}$ is 1. Thus, a signal $S_{DI}(t)$ on which the differential encoding is performed is output from the differential encoder 18. Also, the toggle switch 18a is connected to a terminal 18c when $T_{DI}$ is 0. Thus, a signal $S_{DI}(t)$ on which the differential encoding is not performed is output.

FIG. 20 is a diagram showing a truth table at the time of the differential encoding ($T_{DI}=1$). As shown in FIG. 20, the operation at the time of the differential encoding is NOT of EXOR. Further, FIG. 21 is a diagram showing a truth table at the time of non-differential encoding. At the time of the non-differential encoding, the input to the differential encoder 18 is output as it is. At this time, the non-differential encoding is characterized by not including a phase reference signal (pilot signal).

When the differential encoding is performed, versus-frequency characteristics improve, and also, the reception device can perform demodulation with ease. Further, when the differential encoding is not performed, with the reception device performing synchronous detection, the SNR is improved by 3 dB in theory compared to when the differential encoding is performed. According to the configuration of the differential encoder 18 according to the present embodiment, switching between the differential encoding and the non-differential encoding in accordance with the communication state is enabled. Further, switching between the differential encoding and the non-differential encoding in accordance with the product specifications, the standard of wireless communication system, and the like is also enabled. Further, flexible switching between the differential encoding and the non-differential encoding in accordance with the state, the use conditions and the like of a wireless channel may also be enabled.

(Reed-Solomon Encoder)

The Reed-Solomon encoder 14 uses a Reed-Solomon code of parameters shown in FIG. 22 as the outer code of the payload. Here, reading transmission rate from the PHY header and turning the Reed-Solomon encoder off make reading at high speed possible. Thus, decoding delay can be reduced and the circuit size can be kept from increasing.

(Convolutional Encoder)

The convolutional encoder 16 uses a convolutional code of parameters shown in FIG. 23 for the inner code of the payload and for the encoding of the PHY header.

Figure 24:
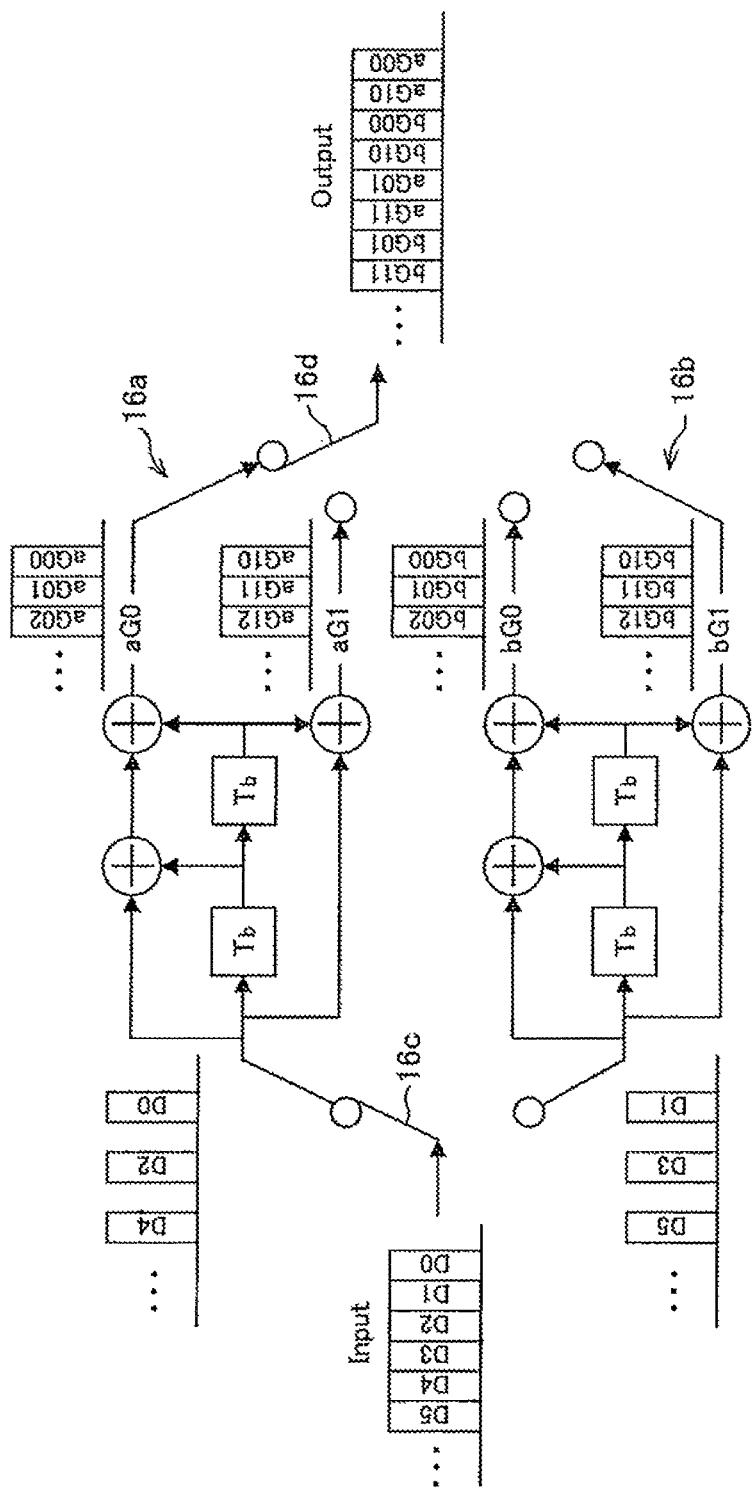
FIG. 24 is a schematic diagram showing a configuration of the convolutional encoder.

FIG. 24 is a schematic diagram showing a configuration of the convolutional encoder 16 according to the present embodiment. As shown in FIG. 24, the convolutional encoder 16 is configured to have two Viterbi encoders 16a and 16b operate in parallel for performing interleaving.

In the configuration of FIG. 24, inputs D0, D1, D2, D3, D4, D5, . . . , to the convolutional encoder 16 are alternately inputted to each of the Viterbi encoders 16a and 16b by a selector 16c for every input. Then, encoding is performed by each Viterbi encoders 16a and 16b, and the output of each of the encoders 16a and 16b are alternately outputted by a selector 16d.

Figure 25:
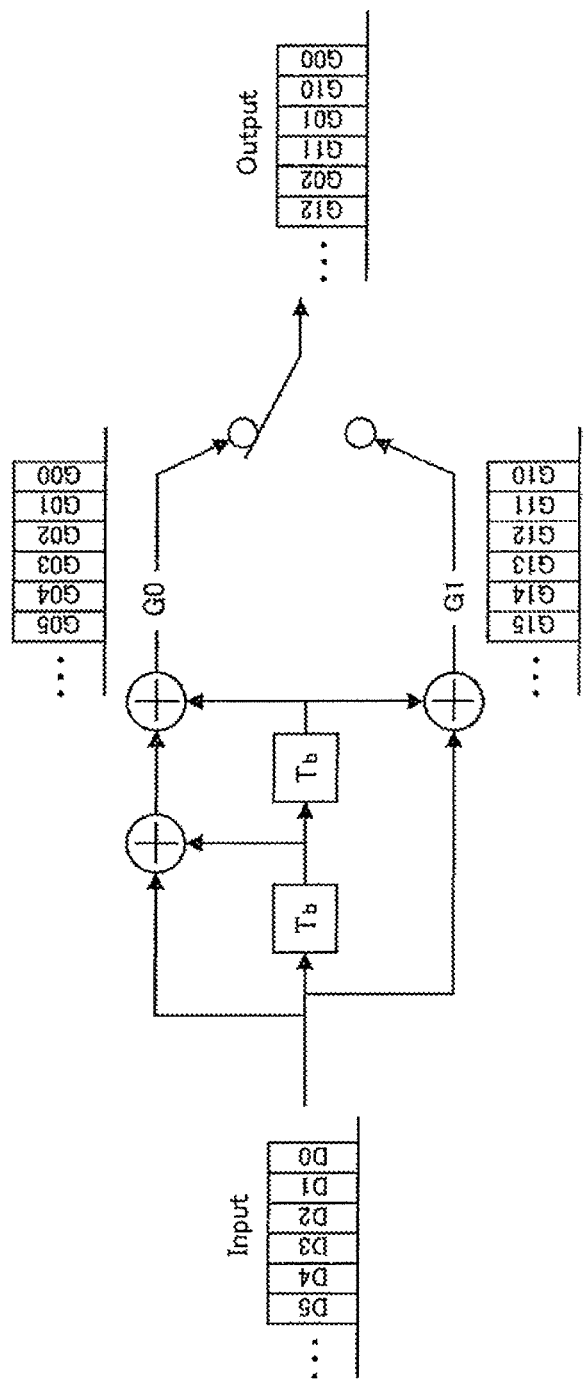
FIG. 25 is a schematic diagram showing a case where only one of Viterbi encoders is operated.

Further, FIG. 25 shows a case where, based on the control by the selectors 16c and 16d, only one of the Viterbi encoders 16a and 16b is operated.

The two Viterbi encoders 16a and 16b operate according to the data rate. When the data rate is a predetermined value or more, the two Viterbi encoders 16a and 16b are operated for performing interleaving as shown in FIG. 24. Thus, even if the data rate is high relative to the operation speed of a circuit configuring the encoder, encoding according to the rate is enabled without unnecessarily raising the operation speed of the circuit. Accordingly, even if the data rate is high, the operation speed of the circuit can be reduced and the circuit can be easily implemented. As for the reception system, by configuring the reception system in a similar manner, a circuit can be easily implemented therein. Further, as shown in FIG. 24, data D0 to D5 inputted to the convolutional encoder 16 are spread more in the time domain than in the case of FIG. 25, and thus, high interleaving effect can be obtained.

On the other hand, when the data rate is less than the predetermined value, only the Viterbi encoder 16a is operated for performing interleaving as shown in FIG. 25. Thus, the Viterbi encoder 16a can be operated at a speed in accordance with the data rate, and the process can be simplified. The operations of the Viterbi encoders 16a and 16b in accordance with the data rate are controlled by the MAC 10.

(Data Rate Control)

FIG. 26 is a schematic diagram showing data rate and parameters controlling the data rate used in the present embodiment. As shown in FIG. 26, seven kinds of data rate are used in the present embodiment, namely, Rate R (560 Mbps), Rate S (522 Mbps), Rate A (261 Mbps), Rate B (130 Mbps), Rate C (65 Mbps), Rate D (32 Mbps) and PHY header (16 Mbps). Rate control is performed according to the state and the like of a channel obtained based on packet error rate (PER) and the like. For example, when the packet error rate is high, the control of reducing the rate is performed. In the present embodiment, the following parameters are manipulated at the time of the rate control.

Process gain (Spreading factor) $G_{SF}$ ($G_{SF}=1, 2, 4, 8, 16$)

ON-OFF of convolutional encoder 16 (convolutional code) (k=3)

ON-OFF of Reed-Solomon encoder 14 (Reed-Solomon code) (240, 224)

As seen from the above, in the present embodiment, the data rate can be controlled by the spreading factor $G_{SF}$ of the spreader 22 and ON-OFFs of the encoders 14 and 16, and thus, the data rate control can be realized with a simple configuration. The rate control based on the parameters described above is performed by the MAC 10. The MAC 10 controls each parameter based on the packet error rate, and controls transmission data rate. Note that the spreading factor $G_{SF}$ used in the present embodiment can be defined as not including a coding gain.

Further, in FIG. 26, the data rate and the number of the convolutional encoders 16 described with reference to FIGS. 24 and 25 are shown in association with each other. As shown in FIG. 26, when the data rate is Rate R or Rate S, the convolutional encoder 16 is turned off, and thus, both of the two Viterbi encoders 16a and 16b are turned off. When the data rate is Rate A, the two Viterbi encoders 16a and 16b are turned on, and as described with reference to FIG. 24, encoding is performed by the two Viterbi encoders 16a and 16b. Also, when the data rate is Rate B or any of the rates shown below Rate B, only the Viterbi encoder 16a is turned on, and as described with reference to FIG. 25, encoding is performed by the Viterbi encoder 16a.

The present invention contains subject matter related to Japanese Patent Application JP 2008-105015 filed in the Japan Patent Office on Apr. 14, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device comprising:
   a first convolutional encoder to convolutionally encode transmission data;
   a second convolutional encoder that is connected in parallel with the first convolutional encoder;
   a selector to alternately input the transmission data to the first convolutional encoder and the second convolutional encoder; and
   a controller to turn off one of the first convolutional encoder and the second convolutional encoder according to a transmission rate of the transmission data.

* * * * *